(12) United States Patent
Kohda et al.

(10) Patent No.: US 7,454,698 B2
(45) Date of Patent: Nov. 18, 2008

(54) DIGITAL DOCUMENT BROWSING SYSTEM AND METHOD THEREOF

(75) Inventors: Takenori Kohda, Yamato (JP); Moriyoshi Ohara, Yokohama (JP); Katashi Nagao, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 09/683,794

(22) Filed: Feb. 15, 2002

(65) Prior Publication Data

US 2002/0186241 A1 Dec. 12, 2002

(30) Foreign Application Priority Data

Feb. 15, 2001 (JP) ............... 2001-039150

(51) Int. Cl.
*G06F 17/20* (2006.01)
*G06F 17/24* (2006.01)

(52) U.S. Cl. .................. 715/254; 715/243; 715/253; 715/256; 715/273

(58) Field of Classification Search ................. 715/513, 715/501.1, 514, 517, 540, 523, 524, 800, 715/243, 254, 256, 273; 707/104.1, 1; 704/9, 704/10
See application file for complete search history.

(56) References Cited

U.S. PATENT DOCUMENTS

| 5,670,984 | A | | 9/1997 | Robertson et al. | |
|---|---|---|---|---|---|
| 5,708,825 | A | * | 1/1998 | Sotomayor | 715/501.1 |
| 5,924,108 | A | * | 7/1999 | Fein et al. | 715/267 |
| 6,122,647 | A | * | 9/2000 | Horowitz et al. | 715/513 |
| 6,205,456 | B1 | * | 3/2001 | Nakao | 715/531 |
| 6,424,362 | B1 | * | 7/2002 | Bornstein et al. | 715/854 |
| 6,456,305 | B1 | * | 9/2002 | Qureshi et al. | 715/800 |
| 6,457,030 | B1 | * | 9/2002 | Adams et al. | 715/523 |
| 6,493,663 | B1 | * | 12/2002 | Ueda | 704/9 |
| 6,556,217 | B1 | * | 4/2003 | Makipaa et al. | 345/667 |
| 6,608,615 | B1 | * | 8/2003 | Martins | 345/156 |
| 6,665,841 | B1 | * | 12/2003 | Mahoney et al. | 715/520 |
| 6,857,102 | B1 | * | 2/2005 | Bickmore et al. | 715/501.1 |
| 2002/0007367 | A1 | * | 1/2002 | Narahara | 707/500 |
| 2002/0046018 | A1 | * | 4/2002 | Marcu et al. | 704/9 |
| 2002/0078091 | A1 | * | 6/2002 | Vu et al. | 707/513 |
| 2002/0138528 | A1 | * | 9/2002 | Gong et al. | 707/530 |
| 2004/0183815 | A1 | * | 9/2004 | Ebert | 345/619 |

FOREIGN PATENT DOCUMENTS

JP 03-113578 5/1991

(Continued)

*Primary Examiner*—Adam L Basehoar
(74) *Attorney, Agent, or Firm*—Eustus D. Nelson; Louis J. Percello; David Aker

(57) ABSTRACT

A digital document browsing system includes: a layout engine for determining the layout of a digital document based on previously obtained historical data for a display form of the digital document, a summarization engine for preparing a summary for the sentences of the digital document based on the historical data for the digital document. Further included is a view generator for arranging the summary obtained by the summarization engine in accordance with the layout, and for generating data relating to the display form of the digital document. A user interface for displaying the digital document on a display device based on the data related to the display form is still further included.

29 Claims, 16 Drawing Sheets

FOREIGN PATENT DOCUMENTS

| | | |
|---|---|---|
| JP | 06-187382 | 7/1994 |
| JP | 07-181952 | 7/1995 |
| JP | 09-152957 | 10/1997 |
| JP | 09-330314 | 12/1997 |
| JP | 11-250089 | 9/1999 |
| JP | 11-272704 | 10/1999 |

\* cited by examiner

DIGITAL DOCUMENT BROWSING SYSTEM AND METHOD THEREOF

BACKGROUND OF INVENTION

1. Field of the Invention

The present invention relates to a digital document display method, and in particular, to a method for changing a layout or using the summary of the layout to display more information in an easily identified form.

2. Background Art

A document in a digital data form is characterized in that, unlike a document printed on paper, it can be easily copied or searched for by using a specific keyword. Thus, at present, many documents are prepared and distributed as digital data instead of being printed (hereinafter a document that is prepared and distributed in a digital data form is called a digital document). A digital document is also characterized in that the size of the document can be easily enlarged or reduced for display on the display device of a computer (hereinafter referred to simply as a display device).

To display a digital document on a display device, since the size of the screen of a display device is physically fixed, a satisfactory display area for the display of a predetermined digital document may not be available.

The enlargement/reduction of material is the display method employed in such a case. That is, the size of an area (hereinafter this area is referred to as a page) wherein digital document content is written is reduced, and when the reduced area is displayed, an entire page can be presented on a display device screen. However, when a large reduction rate must be employed because of the page size of a digital document, while an overview of the layout of a page can be obtained, because a small display font must be used, it is difficult to read the digital document content.

FIG. 15 is a diagram showing an example digital document. When both pages of a two page digital document are displayed on the 15 to 17 inch screen of a standard personal computer display device, the display font and images (the general objects, which are provided as graphics data and include tables, charts and photographs. The same applies hereinafter) must be reduced in accordance with the size of the pages until they are so small it is difficult to read written content and to visually identify images.

According to another method, used to display a digital document when a display area having a satisfactory size is not available, only part of a digital document is presented on a display screen, and a scroll bar is provided for scrolling the display range. Using this method, a user can browse through an entire digital document by arbitrarily scrolling the display area. However, according to this method, a user can obtain only a small amount of information merely by scanning a display screen, and also cannot gain an understanding of the structure of an entire digital document. Further, when a display screen provides little margin for the enlargement of a display to read an especially interesting entry, on such a screen the content is substantially unchanged, and the desire of a user to obtain more detailed information cannot be adequately satisfied.

FIG. 16 is a diagram showing the state wherein the digital document in FIG. 15 is displayed using the scrolling display method. In this case, only a portion that corresponds to an area 1501 in FIG. 15 is displayed with the images and the display font enlarged. And although this makes the displayed portion easy to discern visually, to gain an understanding of the remainder of the digital document the manipulation of a scroll bar 1601 is required.

As is described above, the display device of a computer may not provide a satisfactory display area for the display of a digital document. Conventionally, presently employed display methods provide reduced display sizes or screen scrolling; however, as is described above, when display size is reduced, reading a digital document is difficult because the characters are also reduced, and when scrolling is used, at any one time only a small amount of information is presented for reading.

Thus, a need has been expressed for a display method whereby an entire page of a digital document can be displayed and an understanding of the content or an overview of a desired portion of the document can be obtained, to a degree, without the layout of the page being greatly altered. For this, a device is required that can process digital document content and that can display the processed content in a predetermined display area.

An example display method of this type is an outline display method that ensures the structure of a digital document is clearly delineated, and that ensures, based on the structural information, an overview of the document is displayed in accordance with importance levels. The outline display method includes not only a general outline display process, for which various functions are provided by software such as word processors or editors, but also a process that uses web browsers to analyze the hierarchical structures of HTML documents, as evidenced by tags in the documents, and employs the results to alter display levels in accordance with the display areas that are available. When the outline display method, which reduces the number of sentences to be displayed without greatly changing the overall layout of a document, is used, sentences at low importance levels are defined as non-display entities and their presence is indicated by appending appropriate marks to high importance level sentences. However, this outline display method cannot cope with a case where outline information is not included in a digital document, or a case where a user wants to read only a specific area in detail, regardless of the intent of the creator of the document.

An additional display method of this type is one whereby predetermined sentences in a digital document are summarized. Thus, since instead of the original sentences summaries are used and displayed, the number of sentences required for a display is reduced, without affecting the overall layout of the document.

According to one conventional summarization method, a summary is prepared merely by using information, such as the structure of a sentence, extracted from the digital document. Therefore, both portions that have already been browsed by a user and portions that are yet to be browsed are regarded as contents having the same importance level, and are used to prepare a summary. However, when as much as possible of the information desired by a user is to be packed and used in a summary for a display area having limited space, while taking into account the user's browsing progress, a flexible summarization process is preferable. For example, when the size of the display area for a summary is altered, and the summary must be recreated based on the new area size, a method that reduces the volume of the contents that are currently being displayed (i.e., that have already been browsed) and creates a summary that includes new information would be preferred. As described above, however, according to the conventional summarization method, since the references for the selection of information to be used to prepare summaries is fixed, a flexible summarization process cannot be used.

SUMMARY OF INVENTION

It is, therefore, one feature of the present invention to provide a display method that facilitates the understanding of the contents, or an overview of a desired portion, of a digital document, while displaying an entire page of the digital document without adding explanatory remarks and without altering any document structure, such as the article order.

It is another feature of the present invention to control, for each portion of a digital document, the size of a display area and the displayed contents based on the structure of the digital document and the operating history of a user, and to efficiently provide useful information for the user.

To achieve the above objects, according to one aspect of the present invention, a digital document browsing system having the following configuration is provided. The digital document browsing system includes: a layout engine for determining the layout of a digital document based on digital document display form historical data acquired previously, a view generator for generating, in accordance with the layout, data relating to the display form of the digital document. Still further included is a user interface, for displaying the digital document on a display device based on the data relating to the display form. This system may be provided by mounting the components on a single computer, or by distributing them among multiple computers connected via a network.

According to another aspect of the present invention, a digital document browsing system having the following configuration is provided. The digital document browsing system comprises: display form generator, for generating a display form wherein display areas to be allocated to elements constituting the digital document are altered in accordance with the importance levels of the elements, while the structure of a digital document is maintained; and display means, for displaying the digital document in the display form that is generated by the display form generator.

According to an additional aspect of the present invention, a digital document browsing system having the following configuration is provided. The digital document browsing system comprises: a summarization engine, for preparing summaries for sentences in a digital document based on historical data related to a display form previously used for the digital document; a view generator, for inserting the summaries prepared by the summarization engine instead of the original contents of the digital document, and for generating data relating to the display form of the digital document; and a user interface, for displaying the digital document on a display device based on the data, generated by the view generator, relating to the display form.

According to a further aspect of the present invention, a browser for displaying a digital document on a display device comprises: an input function for entering a digital document to be displayed; and a display function, for displaying the digital document using a predetermined display form, wherein the display function displays, instead of the original contents of the digital document, a summary that is prepared based on historical data related to a display form previously used for the digital document.

According to a still further aspect of the invention, a browser for displaying a digital document on a display device comprises: a display function, for displaying a digital document having a predetermined display form; and a display updating function, for updating the display form, wherein according to a predetermined rule the display function, while maintaining the structure of the digital document, alters display areas to be allocated for elements constituting the digital document, and displays the digital document in the resultant display areas.

According to yet one more aspect of the invention, a sentence summarization system having the following configuration is provided. The sentence summarization system comprises: a summarization history database, in which historical data for the summarization of sentences is stored; and a summarization engine, for summarizing sentences based on the historical data stored in the summarization history database.

According to yet another aspect of the invention, a digital document display method for displaying a digital document on a display device comprises the steps of: extracting the structure of the digital document; replacing, for each of the elements of the structure, the original contents of the digital document with a summary that is prepared based on historical data related to a display form previously used for the digital document, and generating data related to a new display form; and displaying the digital document on the display device based on the data related to the new display form, so that all of the digital document is displayed on one screen.

According to yet an additional aspect of the present invention, a digital document display method comprises the steps of: extracting the structure of a digital document; generating data, while maintaining the structure of the digital document, related to a display form wherein display areas to be allocated to elements that constitute the digital document are altered in accordance with the importance levels of the elements, so that all of the digital document can be presented on one screen; and displaying the digital document on a display device based on the data related to the display form.

According to yet a further aspect of the invention, a sentence summarization method comprises the steps of: obtaining a target sentence to be summarized; obtaining historical data related to a summary for the target sentence from a summarization history database in which historical data are stored that are related to a previous summarization of a predetermined sentence; and determining which parameters are required for the preparation of the summary based on the historical data, and preparing the summary of the target sentence based on the parameters.

Various other objects, features, and attendant advantages of the present invention will become more fully appreciated as the same becomes better understood when considered in conjunction with the accompanying drawings, in which like reference characters designate the same or similar parts throughout the several views.

DETAILED DESCRIPTION

Figure 1:
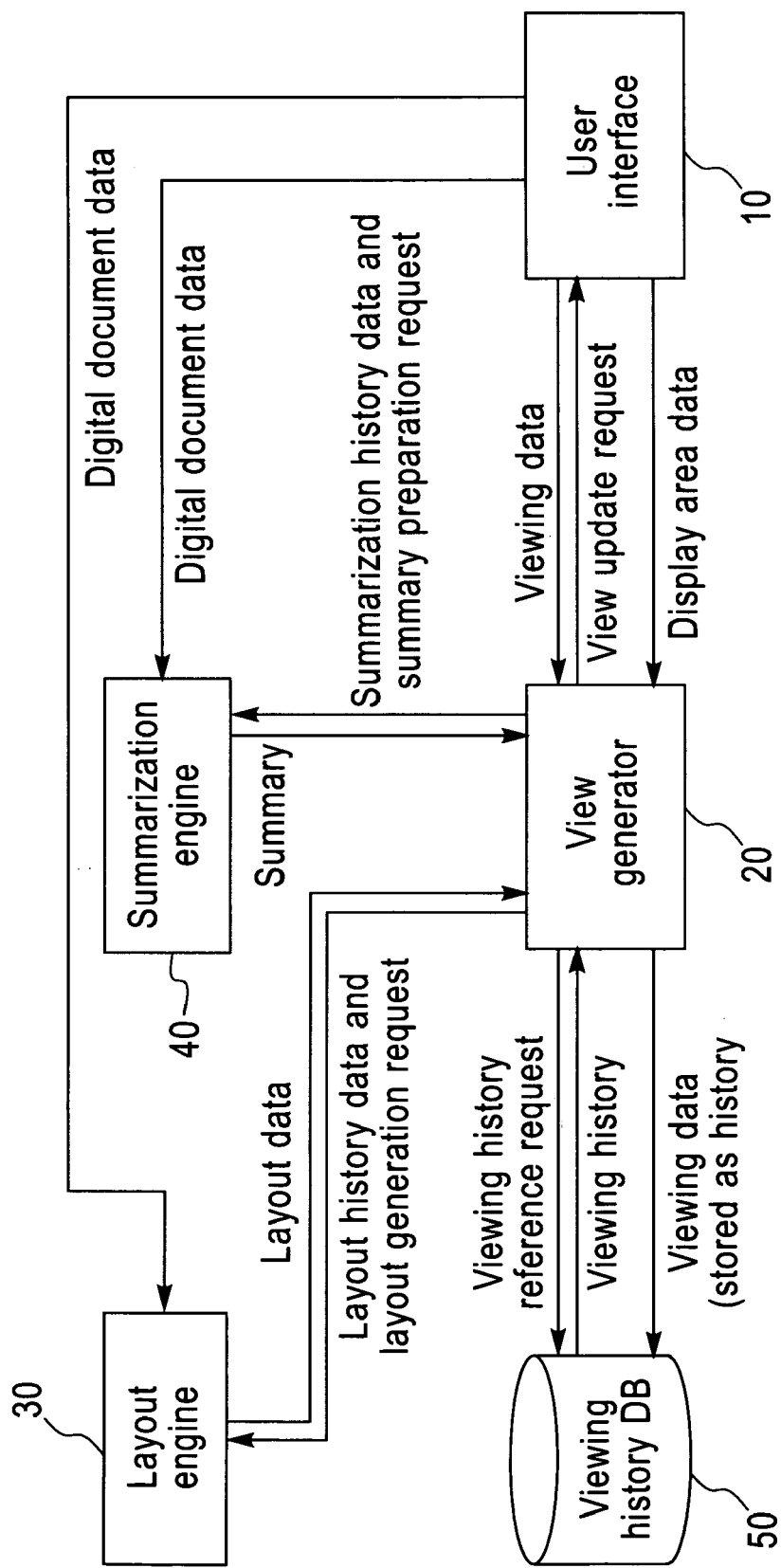
FIG. 1 is a diagram for explaining the general configuration of a digital document browsing system according to one embodiment of the present invention.

The layout engine employs the historical data when allocating a display area, for the display form of the digital document, for each element comprising the digital document. The elements constructing the digital document are concepts, and include the sentences (the title, the body and paragraphs) of the document and images.

The digital document browsing system further comprises: a history database, wherein after the digital document has been displayed, through the user interface, by using a predetermined display form for a predetermined period of time, and when the display form is updated by the user, data relating to the display form that has been used is stored as historical data in the history database, and wherein the layout engine determines the layout of the digital document based on the historical data obtained from the history database.

The digital document browsing system further comprises: a summarization engine, for preparing summaries for the sentences in the digital document based on the historical data acquired for the digital document, wherein the view generator arranges the summaries, prepared by the summarization engine, in accordance with the layout determined by the layout engine, and generates data for a display form.

Based on the historical data, the summarization engine determines which parameters are required for summarization, and prepares a summary for each of the predetermined sentence elements that constitute the sentences of the digital document. The parameters required for the preparation of a summary are a summarization keyword, which is to be inserted into the summary, and a summarization rate.

Since the element order is unchanged because the document structure is maintained, the user can easily understand the structure of the entire digital document. Further, the importance level of an element can be dynamically determined based on the history of the display of the digital document, or can be determined in accordance with static references based on the document structure or references that a system user sets in advance.

In order to display an entire page of the digital document in a single display area, the display form generator allocates a small display area for an element having a low importance level, and a large display area for an element having a high importance level.

Either this, or the display form generator arranges a display area near the center of the display form for an element having a high importance level, and arranges a display area nearer the side of the display form for an element having a low importance level.

Based on the historical data, the summarization engine determines which parameters are required for summarization, and prepares the summary for each of the predetermined sentence elements constituting the sentences of the digital document.

The digital document browsing system further comprises: a history database, wherein, after the digital document has been displayed, through the user interface, with a predetermined display form for a predetermined period of time, and when the user has updated the display form, data related to the display form that has been used is stored as historical data in the history database, and wherein the summarization engine summarizes the sentences of the digital document based on the historical data obtained from the history database.

This browser includes a web browser for displaying an HTML document as a digital document, a viewer for displaying a PDF file, and various other browsers and viewers for displaying arbitrary digital documents.

Based on the historical data, the display function determines which parameters are required for summarization, and prepares the summary for each of the predetermined sentence elements constituting the sentences of the digital document.

Either this, or based on the historical data, the display function displays the digital document using a display form wherein the summary is displayed in display areas arranged for the individual elements that constitute the digital document.

The display function displays an image, which is an element constituting the digital document, using a size that corresponds to the display area of a sentence portion in the digital document that is relevant to the image.

In the display form of the digital document to be displayed, initially, the display function enlarges a display area for an element located at the head of the digital document, and reduces display areas for succeeding elements; and reduces a summarization rate for an element located at the head of the digital document and increases the summarization rate for succeeding elements. Each time the display updating function updates the display form upon receiving an update request, the display function shifts rearward the range wherein a large display area is set and the summarization rate is reduced for the sentence element.

The display updating function accepts an update request for a predetermined designated portion in the digital document that is currently displayed, and in accordance with the update request, enlarges a display area for an element in the designated portion, and displays a sentence in the designated portion, instead of a sentence having a low summarization rate.

Based on the historical data, the summarization engine determines which parameters are required for summarization, and prepares the summary for each of the predetermined sentence elements that constitute the sentences of the digital document.

Furthermore, the present invention can be provided as a program that permits a computer to implement the digital document display methods and the sentence summarization method, and can also be provided as a storage medium in which this program is stored or as a program transmission apparatus for distributing this program via a network.

The preferred embodiment of the present invention will now be described in detail while referring to the accompanying drawings.

An overview of the present invention will now be provided. A digital document browsing system for this invention employs the two following ideas to determine which display form (hereinafter referred to as a view) to use when displaying a digital document, and to use the display form to display the digital document.

First, the digital document browsing system of this invention generates a display layout for the digital document while taking the display history into account. Then, assuming that an entire page of the digital document is displayed on a single display screen, the display sizes and the display positions of the images and characters are determined, so that the order in which the elements (the sentences, the title and the images) are arranged in the digital document is maintained, and information useful to the user can, to the extent possible, be packed into a limited display area. Specifically, a large display area is allocated for an element that includes new information for the user, and a small display area is allocated for an element that the user has already browsed. The large display area for the digital document is arranged nearer the center of the display screen, and the small display area is arranged nearer the edge.

Second, the digital document browsing system of the invention employs the display history to determine the meaningful importance level of the sentences and words in the digital document, and employs the summarization engine to prepare a summary that can be fitted into the limited display area. The meaningful importance level is not the importance level determined in accordance with a static reference based on the structure of a digital document, but an index that includes a dynamic reference explicating the need of the user to read the document. Various references can be employed; for example, before the display layout is changed, certain importance levels can be lowered by assuming that previously displayed information the user is fully aware of previously displayed information. That is, by referring to the display history, the summarization rate is increased by thinning out the contents it is assumed the user already read, so that a summary including much content that the user has not yet read can be prepared. As a result, a large quantity of new information can be provided for the user.

FIG. 1 is a diagram for explaining the general configuration of the digital document browsing system according to this embodiment. In FIG. 1, the digital document browsing system of the embodiment comprises: a user interface 10, a view generator 20, a layout engine 30, a summarization engine 40, and a viewing history database (DB) 50. Of the components in FIG. 1, the user interface 10, which is display means for displaying a digital document on a display device, the view generator 20, which is display form generation means for generating the display form of the digital document, the layout engine 30, and the summarization engine 40 are virtual software blocks implemented by a CPU controlled by a computer program. A viewing history database 50 is provided by a magnetic disk drive or another storage device, for example, and a database management system (DBMS: Database Management System). The computer program for controlling the CPU and the database management system are provided by being stored on a storage medium, such as a CD-ROM or a floppy disk, or by being transmitted via a network.

The user interface 10 displays a target digital document on the screen of the display device. The user interface 10 further receives a request, such as a view update request, based on an operation performed by a user, and instructs the view generator 20 to generate a new view. In addition, when the size of the display area for the digital document on the display screen is changed, or when the contents to be displayed are changed, the size of a new display area is examined, and the view generator 20 is instructed to generate a new view. It should be noted that the user interface 10 may be an independent application that opens a window for displaying a digital document on the display device, or may be carried out in such a manner that the function for transmitting a view update request or display area information to the view generator 20 is provided, using the plug-in method, for a web browser or a browser for a PDF (Portable Document Format) file.

Figure 2:
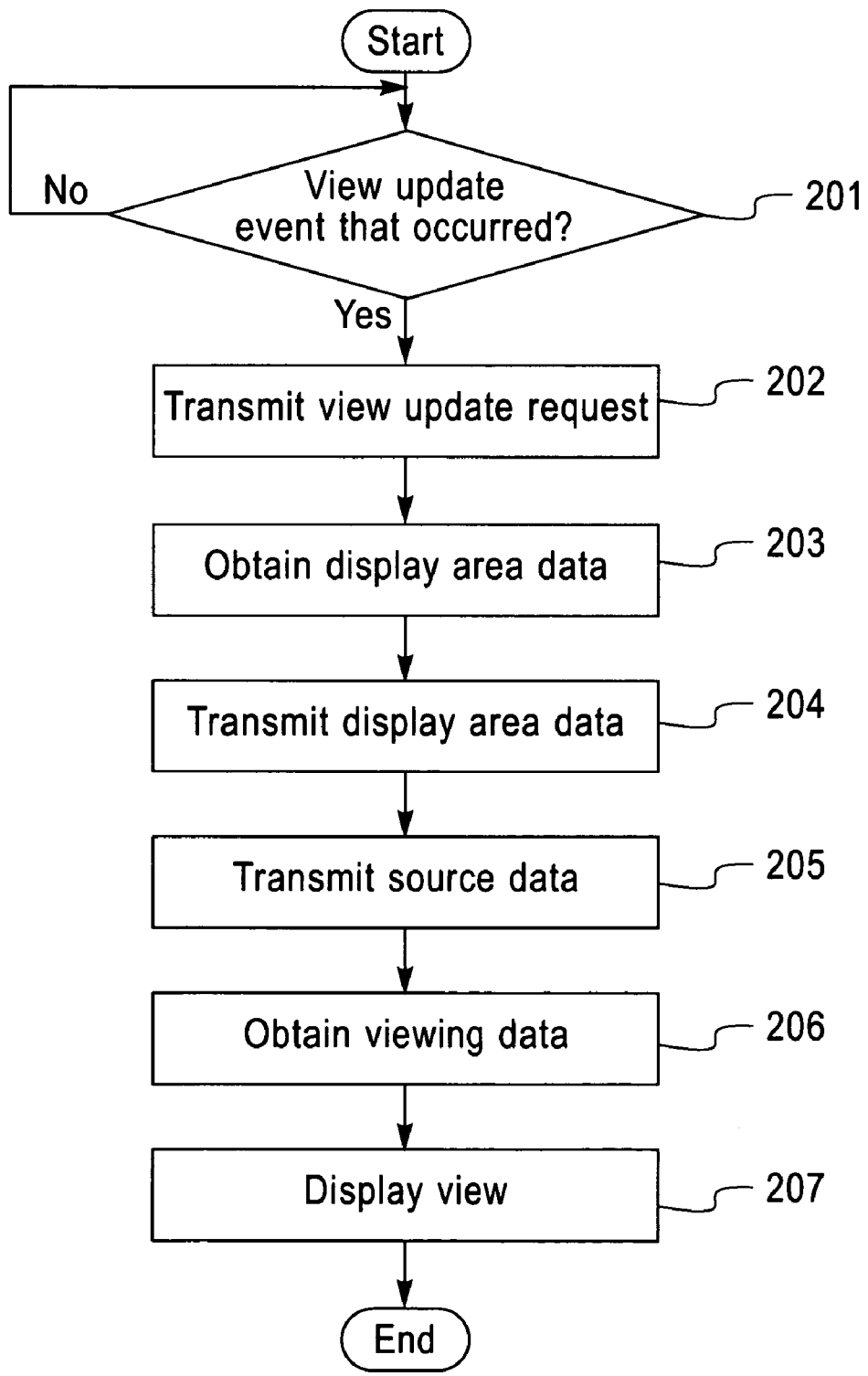
FIG. 2 is a flowchart for explaining the operation of a user interface according to the embodiment.

FIG. 2 is a flowchart for explaining the operation of the user interface 10. As is shown in FIG. 2, when a view update event occurs, the user interface 10 transmits to the view generator 20 a view update request (steps 201 and 202). The view update event may be, for example, an operation for the changing of a document to be displayed, the alteration of the size of a display area or the updating of a view, initiated when a mouse is used to select and click on a view update button.

Then, the user interface 10 obtains data for a new display area based on the view update event (step 203), and transmits the data to the view generator 20 (step 204). The data related to the display area is that concerning the sizes, the shapes and the positions of display areas that are allocated for the elements (the paragraphs, the title and the images) of the digital document that are currently being displayed. Subsequently, the user interface 10 transmits the source data for the displayed digital document to the layout engine 30 and the summarization engine 40 (step 205).

Thereafter, the user interface 10 waits until the data (hereinafter referred to as view data) relating to a new view is received from the view generator 20. When the user interface 10 receives the new view data (step 206), it employs the data to display the digital document on the screen of the display device (step 207).

The view generator 20 generates a new view for the digital document in accordance with the view generation request received from the user interface 10, transmits the view data for the new view to the user interface 10. The view generator 20 monitors the state of the user interface 10, and when a specific history storage condition is satisfied, view data indicating the current state of the view is employed to update the contents of the viewing history database 50.

Figure 3:
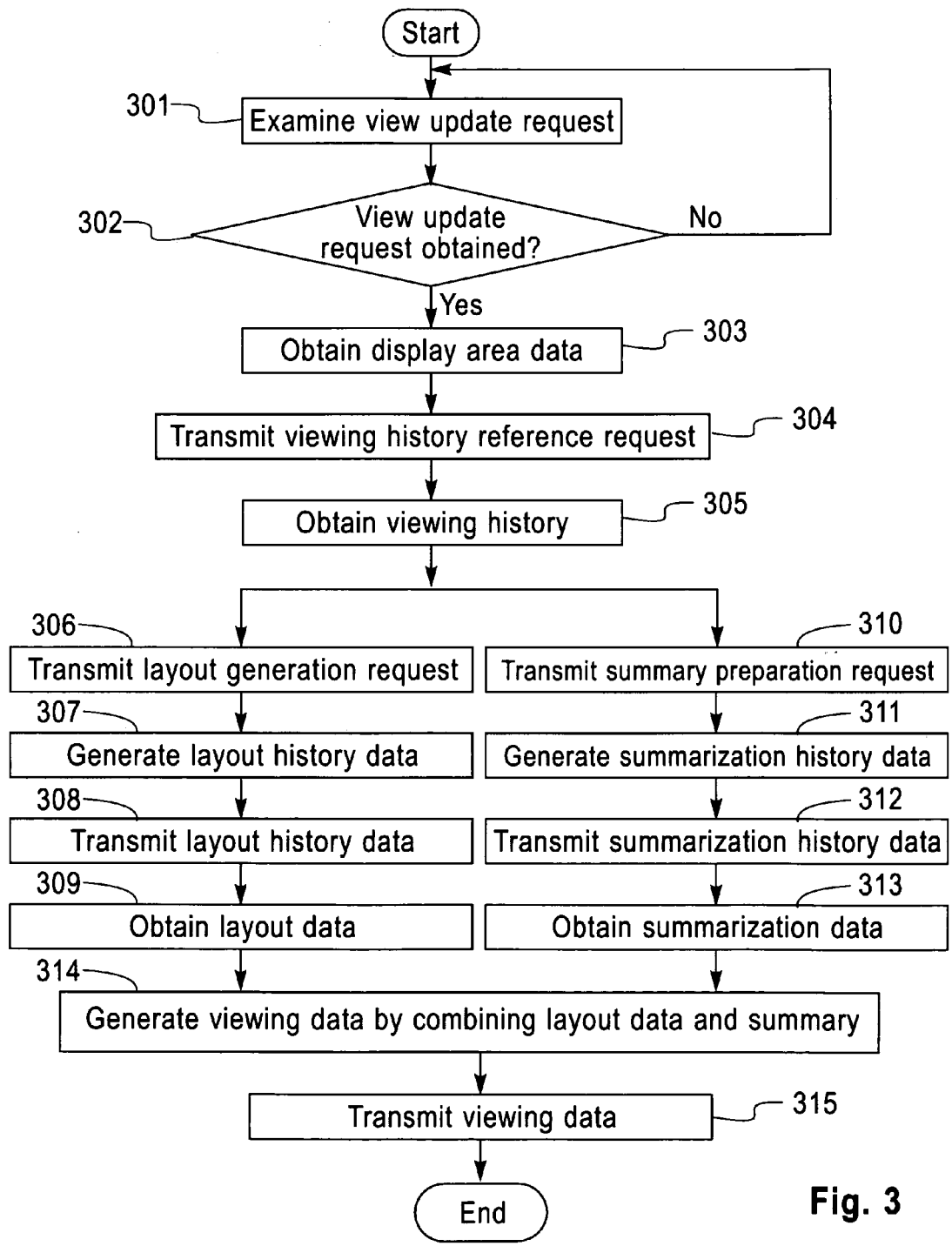
FIG. 3 is a flowchart for explaining the processing performed by a view generator for generating viewing data according to the embodiment.

FIG. 3 is a flowchart for explaining the processing performed by the view generator 20 when generating view data. As is shown in FIG. 3, when the view generator 20 receives a view update request from the user interface 10 (steps 301 and 302), the view generator 20 further receives from the user interface 10 data for a display area (step 303). Sequentially, the view generator 20 designates a digital document to be displayed, transmits a viewing history reference request to the viewing history database 50, and waits until the viewing history is received from the viewing history database 50 (step 304).

Upon the receipt of a desired viewing history from the viewing history database 50 (step 305), the view generator 20 transmits a layout generation request to the layout engine 30 (step 306), generates layout history data based on the viewing history received from the viewing history database 50, and transmits the layout history data to the layout engine 30 (steps 307 and 308). The view generator 20 then waits until layout history data is received from the layout engine 30. The layout history data is a subset of the data related to the layout included in the viewing history data. The layout history data includes, for example, document structure data, the display font size and the position of each sentence in the display, the relationship (e.g., the positional relationship) between the images and the main body of the document, and the image display sizes.

The view generator 20 transmits, to the summarization engine 40, a summary preparation request designating the sentence in the digital document for which summarization is required, a summarization keyword (a word used for summarization) and a summarization rate (the ratio of the length of the summary to the length of the original sentences) (step 310). The summarization keyword and the summarization rate that are designated in this request may be automatically determined based on the event type that is detected by the user interface 10, or may be dynamically determined based on the viewing history data obtained at step 305.

Next, the view generator 20 generates the summarization history data based on the viewing history received from the viewing history database 50, and transmits the summarization history data to the summarization engine 40 (steps 311 and 312). The view generator 20 then waits until the summary is transmitted by the summarization engine 40. The summarization history data is a subset of the data related to the summarization that are included in the viewing history data. For example, the summarization keyword and the summarization rate are so included.

When the view generator 20 receives the layout data from the layout engine 30 and the summary from the summarization engine 40 (steps 309 and 313), the view generator 20 generates view data by combining the received layout data and the summary (step 314). A sentence or an image is allocated to a corresponding area as determined by the layout data. Further, an appropriate display font size is also determined for the display in corresponding areas of all the sentence summaries. Thereafter, the generated view data is transmitted to the user interface 10 (step 315).

Figure 4:
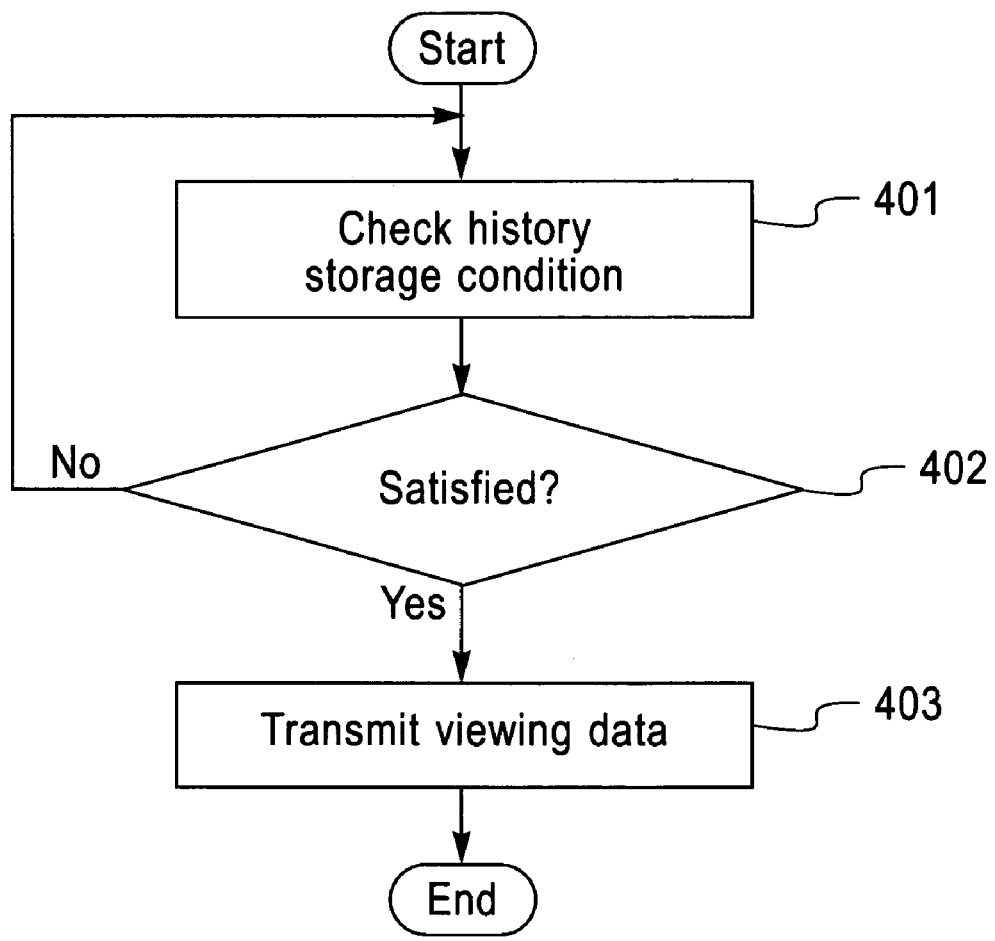
FIG. 4 is a flowchart for explaining the processing performed by the view generator according to the embodiment for updating a viewing history database.

FIG. 4 is a flowchart for explaining the processing performed by the view generator 20 to update the viewing history database 50. As is shown in FIG. 4, the view generator 20 monitors the user interface 10, and examines a specific history storage condition (step 401). When the history storage condition is satisfied, the view data generated at step 314 in FIG. 3 is transmitted to the viewing history database 50 (steps 402 and 403).

The history storage condition is a condition during which a user determines whether the contents of a digital document that are currently being viewed have already been read. Specifically, in this case, for example, when a predetermined period of time (e.g., about 10 seconds) has elapsed during which no particular operation has been performed for the digital document that is displayed, a specific operation for changing the contents and the view of the digital document is performed. The passage of the period of time during which no operation is performed is defined as a history storage condition, because the time the user spends reading the contents of the digital document is taken into account. That is, when operations for changing the contents or the view of a digital document are continuously repeated before the set time has elapsed, it is assumed that the user has not read the contents that are presently on view. Thus, in this case, even when the view displayed on the display device is updated, viewing data is not stored as viewing history data in the viewing history database 50. An arbitrary period of time can be set by a user of the system of this embodiment.

The layout engine 30 analyzes the source data for the digital document received from the user interface 10, and extracts the logical structure (document structure) of the digital document. Upon receiving a layout generation request from the view generator 20, the layout engine 30 employs the extracted logical structure of the digital document to generate layout data for generating a new view. The principle, on which the determination of the layout performed by the layout engine 30 is based, is that an entire page of a digital document should be displayed on one display screen, while the structure of the digital document is maintained. It should be noted, however, that for the layout it can also be determined that the digital document should be divided into segments and the segments displayed on multiple display screens.

Figure 5:
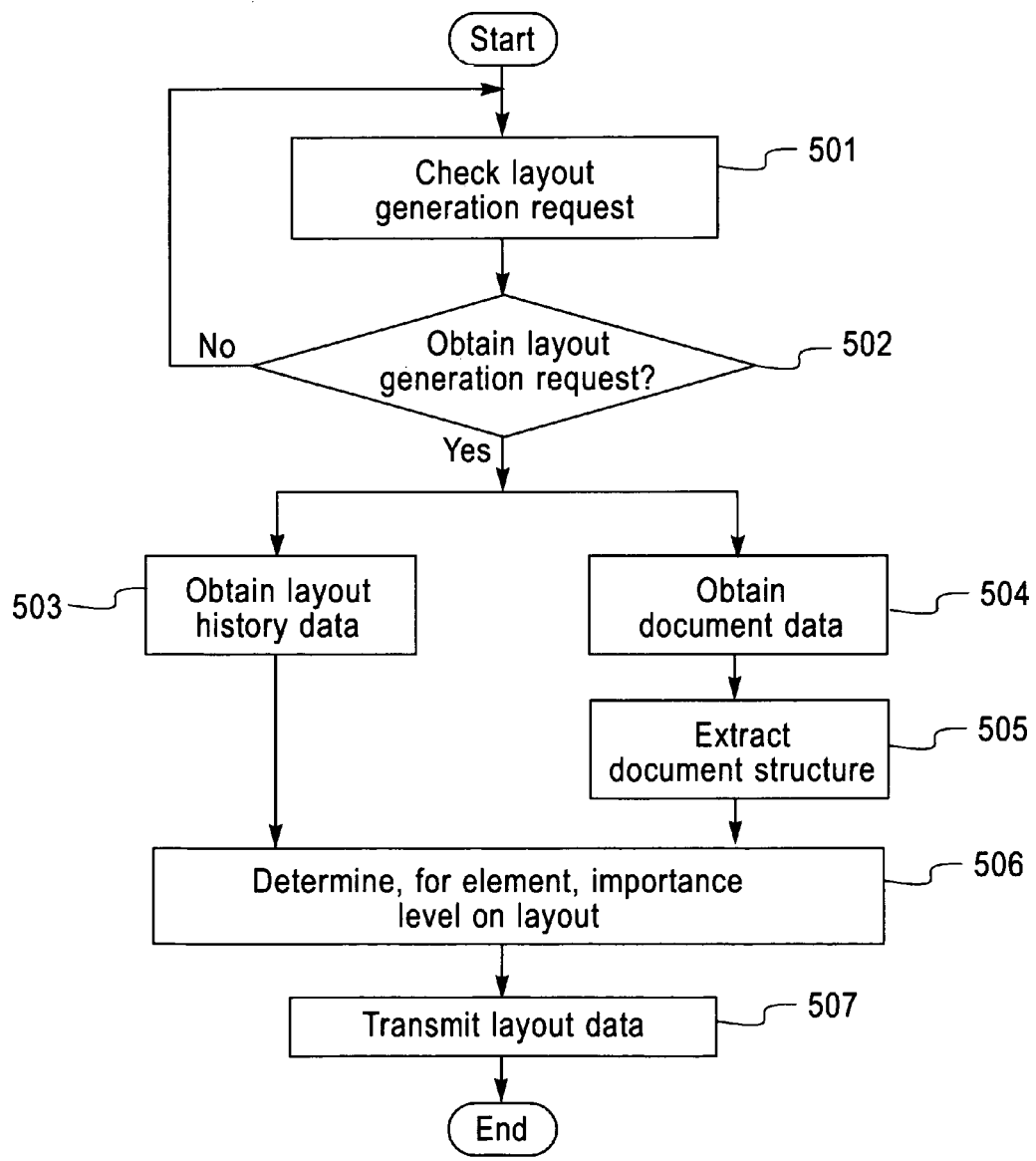
FIG. 5 is a flowchart for explaining the operation of a layout engine according to the embodiment.

FIG. 5 is a flowchart for explaining the operation of the layout engine 30. As is shown in FIG. 5, when the layout engine 30 receives a layout generation request from the view generator 20 (steps 501 and 502), it also receives layout history data from the view generator 20 (step 503). In addition, the layout engine 30 receives the source data for a target digital document from the user interface 10 (step 504), and extracts the document structure (step 505). The document structure is the logical structure of a digital document that is extracted based on the structural characteristics (the headlines, such as the title or the subtitle, or conjunctions) of the individual sentences that constitute the digital document. For the images in the digital document, the relationship (hereinafter referred to as an image/body relationship) with the main body of the document is extracted based on the positional relationships with the paragraphs and the title. Since the document structure is extracted from the structural information of a digital document, explanatory information, such as an outline editing mark, need not be provided in advance for the digital document.

The layout engine 30 determines the importance levels of the elements (sentences, words, images, etc.) of the digital document based on the document structure and the image/body relationship, which are extracted from the source data for the digital document, and the layout history data, which is received from the view generator 20 (step 506). Specifically, for example, a low importance level is set for a sentence and an image that were previously displayed, and a high importance level is set for new information. However, as time elapses, a user may forget information that was previously displayed. Thus, when an extended period of time has elapsed since the last time the information was displayed (one day, one week, one month, etc.), the importance level may be increased in accordance with the elapsed time.

Finally, the layout engine 30 determines the layout that reflects the importance levels assigned to the elements, and transmits the layout data to the view generator 20 (step 507). When the importance level of an element is reflected in the layout, when viewed, information having a high importance level is more easily seen. To do this, for example, a large display area is allocated for an element having a high importance level, or an element having a high importance level is located near the center of the display area for the digital document, while an element having a low importance level is arranged closer to the edge of the display area.

It should be noted that the layout engine 30 does not change the arrangement so as to destroy the order of the elements in the digital document or the positional relationship existing between the elements. That is, when the display area for a specific element is to be enlarged, the adjacent display area is shifted to the side, or is reduced in size, to obtain the desired area size. Therefore, while the structure of the original digital document is maintained, the layout can be determined in accordance with the importance levels of the elements. Since an element having a high importance level is enlarged and displayed, or arranged near the center of the display area, while the structure of the digital document is maintained, information important to the user is collected and enlarged and is clustered around the center of the display area, presenting a view similar to one obtained using a fisheye lens.

The summarization engine 40 receives the source data for a digital document from the user interface 10, and prepares summaries for the digital document in accordance with the summary preparation request received from the view generator 20. This summary preparation is performed for each of the elements of the sentences (hereinafter referred to as sentence elements) in the digital document. In other words, the summaries are prepared at various summarization rates for individual sentence elements. In this embodiment, an arbitrary unit, such as a set of sentences following the title, one paragraph or one sentence, can be set as a sentence element. In the following explanation, a set of sentences following the title is employed as a unit, and a summary is prepared for each sentence element.

Figure 6:
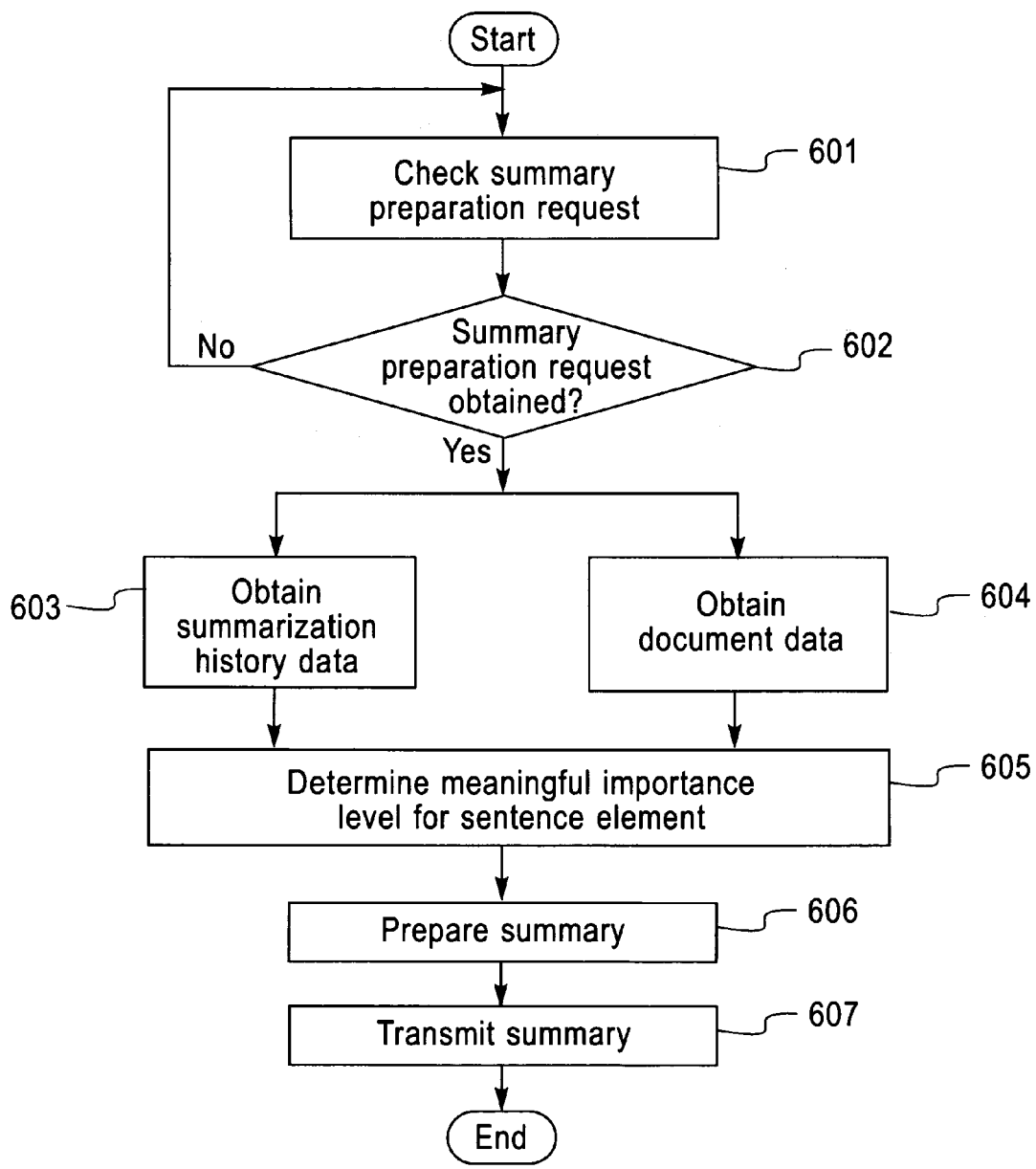
FIG. 6 is a flowchart for explaining the operation of a summarization engine according to the embodiment.

FIG. 6 is a flowchart for explaining the operation of the summarization engine 40. As is shown in FIG. 6, when the summarization engine 40 receives the summary preparation request from the view generator 20 (steps 601 and 602), the summarization engine 40 receives in addition the summarization history data from the view generator 20 (step 603). The summarization engine 40 then receives the source data for a target digital document from the user interface 10 (step 604). The following process is performed for each sentence element that constitutes a unit for the preparation of a summary.

Subsequently, based on the summarization history data received from the view generator 20, and the summarization keyword and the summarization rate that are designated in the summary preparation request, the summarization engine 40 determines the meaningful importance levels of the sentences or the words constituting is the sentence elements (step 605). The meaningful importance level is the degree of significance ascribed by a user to desired information for each sentence or word in the sentence of a pertinent sentence element. That is, in the summarization history data, since a sentence or a word that was previously displayed in a view is information that the user already obtained, its importance level is reduced. However, as well as for the importance levels assigned during the layout, while taking into account the possibility the user will forget information previously assimilated after an extended period of time (one day, one week, one month, etc.) has elapsed since the information was last displayed, the importance level can be increased in accordance with the elapsed time. In addition, as an assumption, there is the default importance level that is determined based on static information, such as the structure of a digital document, or an importance level that is set by the user of the system of the embodiment. Further, the importance level of the information is dynamically changed while taking into account the fact that the user has already assimilated the pertinent information.

Following this, the summarization engine 40 prepares summaries that reflect the determined meaningful importance levels assessed for the sentences or words (step 606), and transmits the summaries to the view generator 20 (step 607). In this embodiment, various well known methods can be employed for the preparation of the summaries.

As is described above, since the summaries that are prepared reflect the meaningful importance levels that are determined based on the previous display history, useful summaries that include new information can be generated for the user each time. This is effective for the oral output of the summaries. That is, when the meaningful importance levels of sentences or words is determined based on the previous output history, and when the summaries for oral output are prepared based on the importance level, information that is new and useful to an audience can be included each time the summaries are output.

The viewing history database 50 obtains viewing data from the view generator 20, and stores it. And then, upon receiving the request from the view generator 20, the previous viewing data (viewing history) is obtained from the viewing history database 50. This viewing data includes the display area size, the display contents, various parameters (the summarization keyword, the summarization rate, etc.) used for summarization, and layout data. As is explained in the operation of the view generator 20, the viewing history data can be separated into layout history data and summarization history data in the viewing history of the corresponding digital document. That is, the viewing history database 50 functions as the layout history database for the layout engine 30, and functions as the summarization history database for the summarization engine 40.

Figure 7:
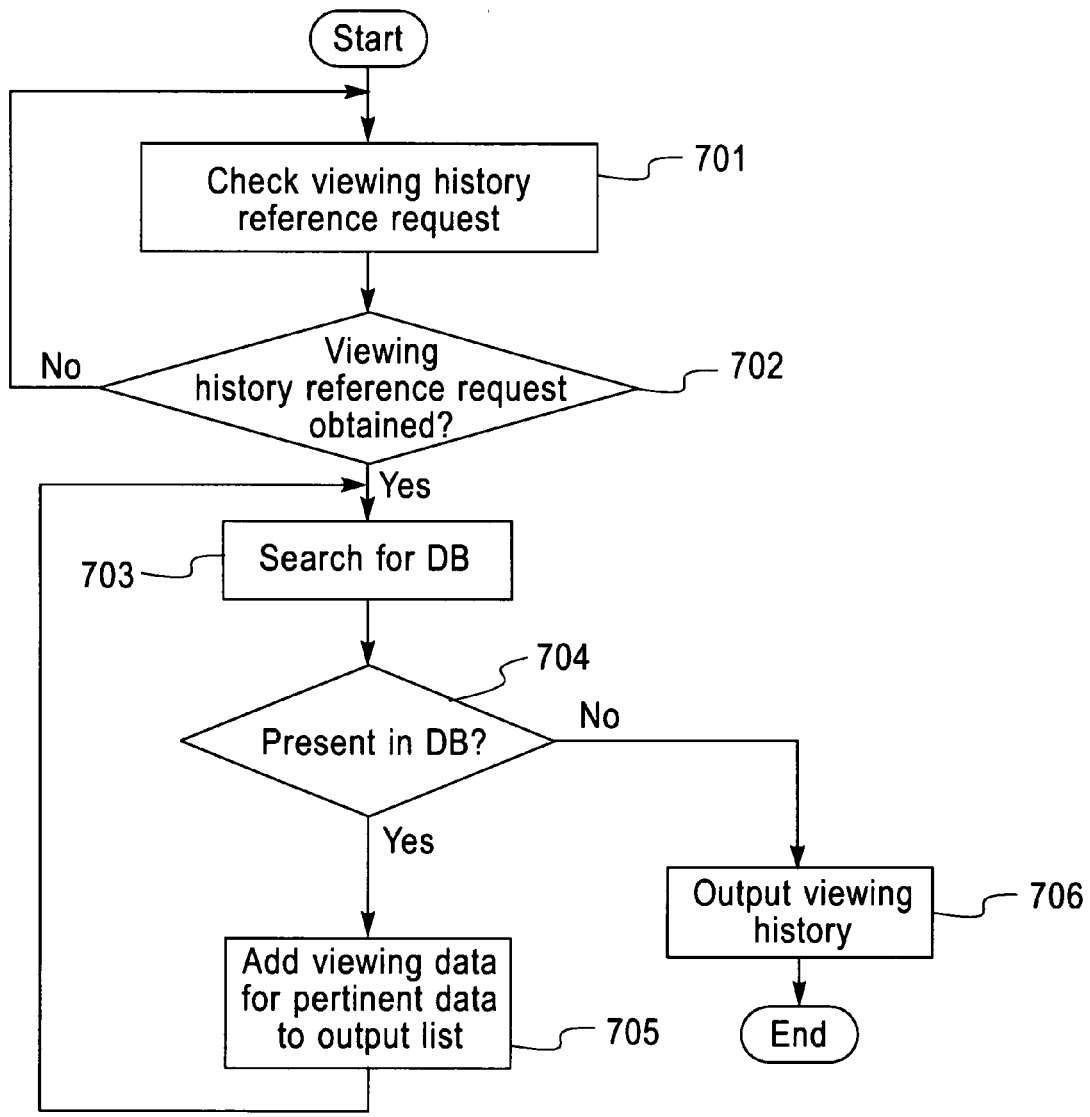
FIG. 7 is a flowchart for explaining the operation of the viewing history database when a viewing history reference request is issued.

FIG. 7 is a flowchart for explaining the operation of the viewing history database 50 when the view generator 20 issues a reference request for the viewing history. As is shown in FIG. 7, when the viewing history reference request is transmitted by the view generator 20 to the viewing history database 50 (steps 701 and 702), the database 50 is examined to find the viewing history for the digital document that is consonant with the viewing history reference request (step 703). When the pertinent viewing history is found, it is added to the output list (steps 704 and 705). Then, when all the pertinent viewing history has been extracted from the database (all the viewing history are added to the output list), the output list is returned to the view generator 20 in response to the viewing history reference request (steps 704 and 706).

Figure 8:
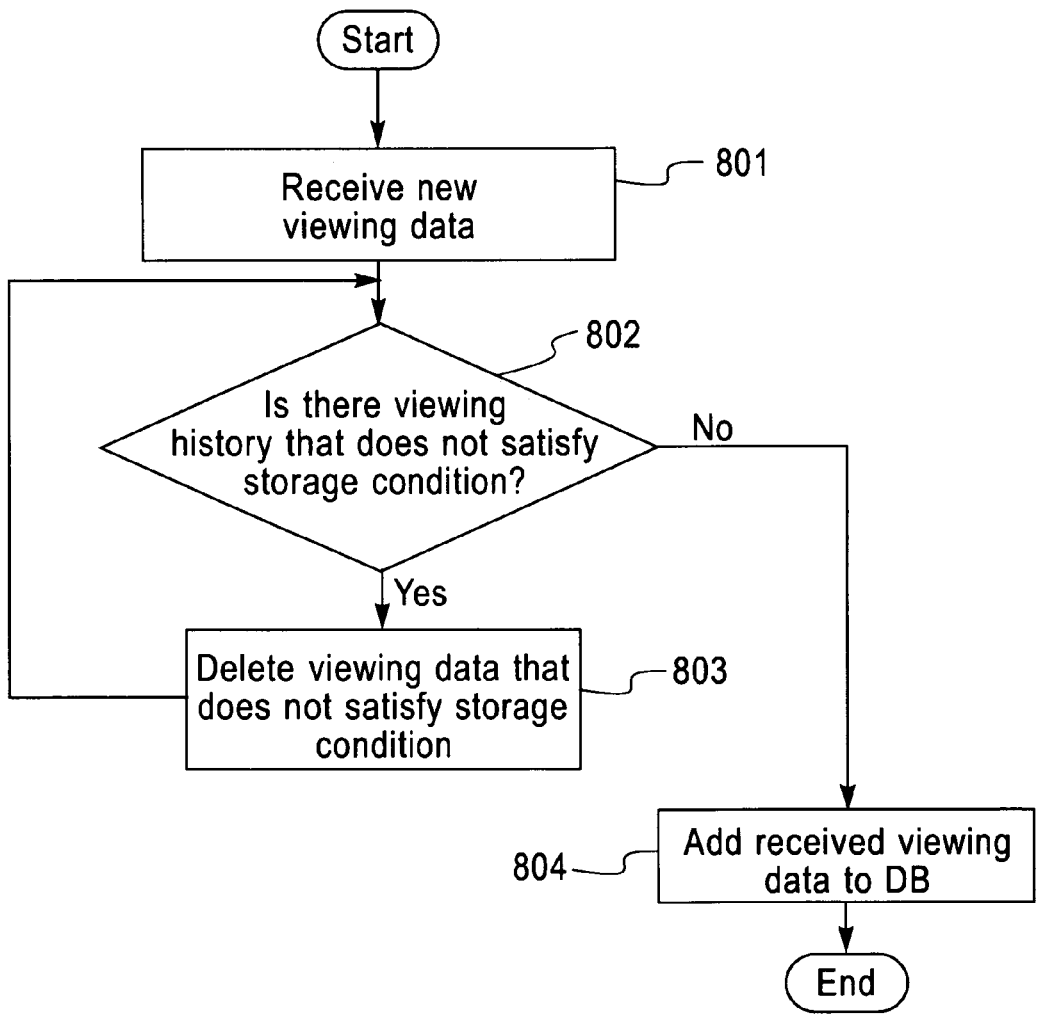
FIG. 8 is a flowchart for explaining the processing for updating the data for the viewing history database.

FIG. 8 is a flowchart for explaining the operation of the viewing history database 50 when the view generator 20 updates the data. As is shown in FIG. 8, when new viewing history is transmitted by the view generator 20 to the viewing history database 50 (step 801), a check is performed to determine whether there is viewing history in the database 50 that does not satisfy the storage conditions (step 802). When such viewing history is present, it is deleted (step 803). But when viewing history that does not satisfy the storage conditions is not present or has been deleted, the newly received viewing history is added to the database 50 (step 804).

The viewing history stored in the viewing history database 50 is a group of view data that reflects the state of the digital document displayed on the display device by the user interface 10. Specifically, this data group includes a view ID for specifying each viewing history, a sentence in a digital document that is used for summarization, the conditions (the summarization rate, the summarization keyword, etc.) for preparing summaries, the summarization date, the display contents after summarization, the display layout, the display size and the display position of each sentence in the digital document, and the display size and the display position of each image in the digital document.

Figure 9:
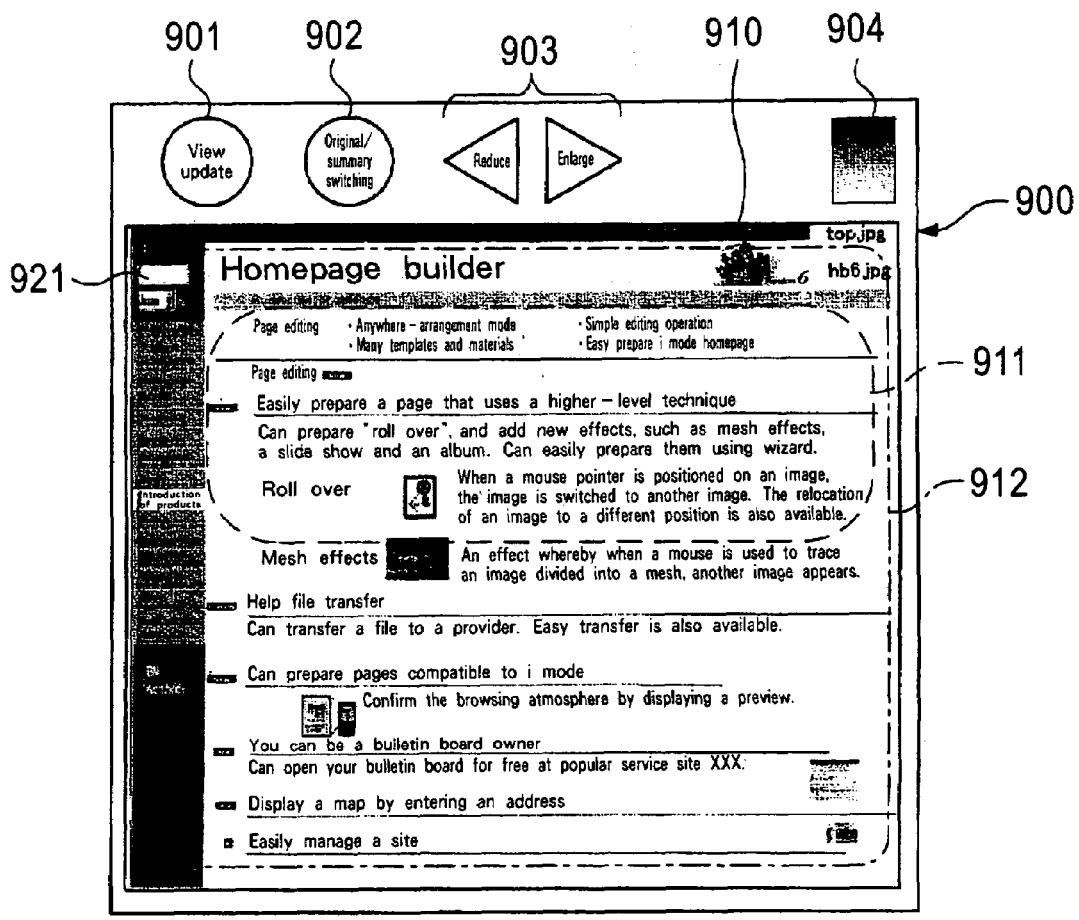
FIG. 9 is a diagram showing an example view provided by the user interface according to the embodiment.
Figure 15:
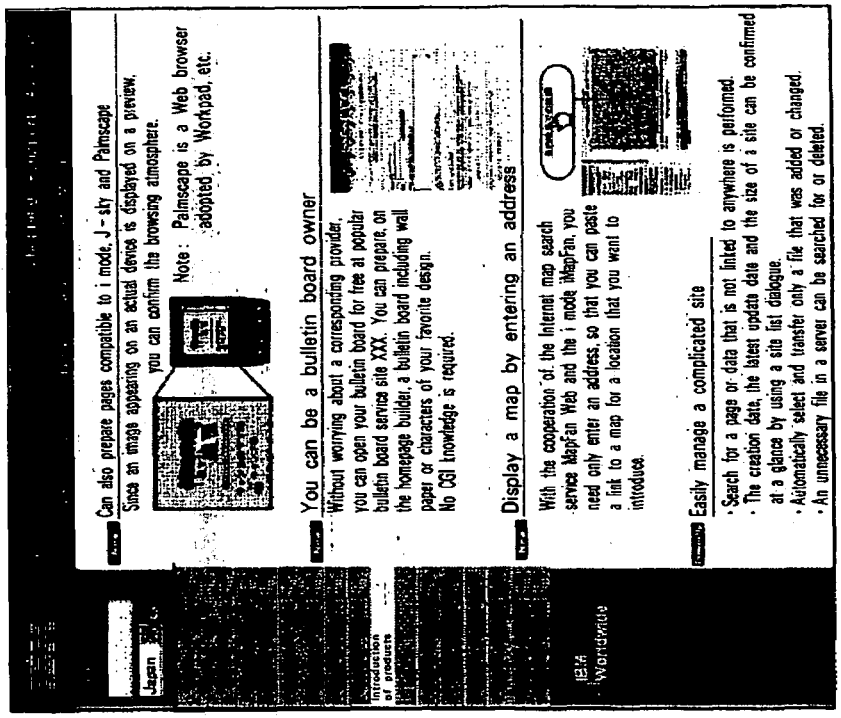
FIG. 15 is a diagram showing an example digital document.
Figure 15:
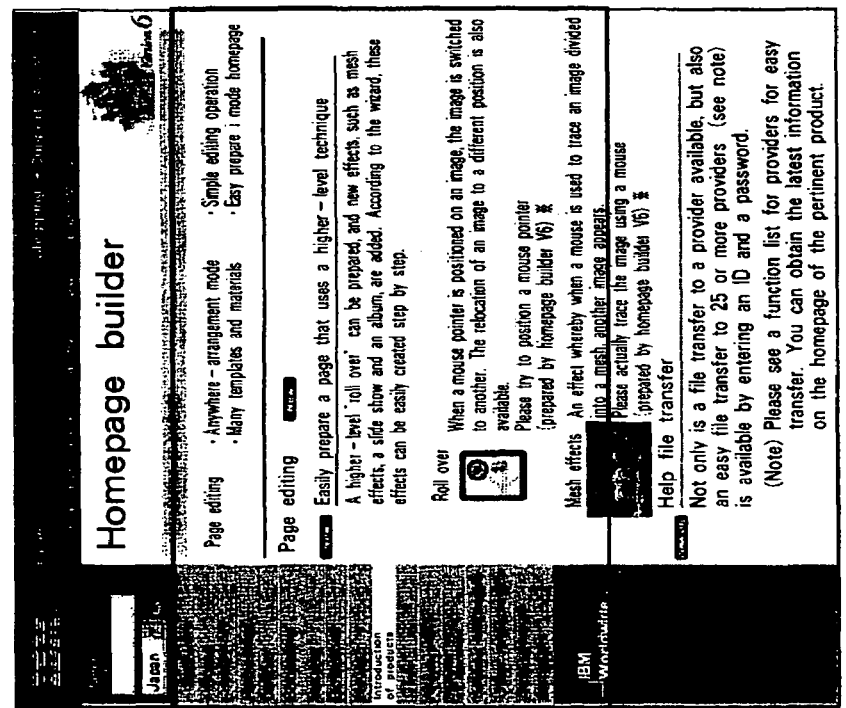
Figure 16:
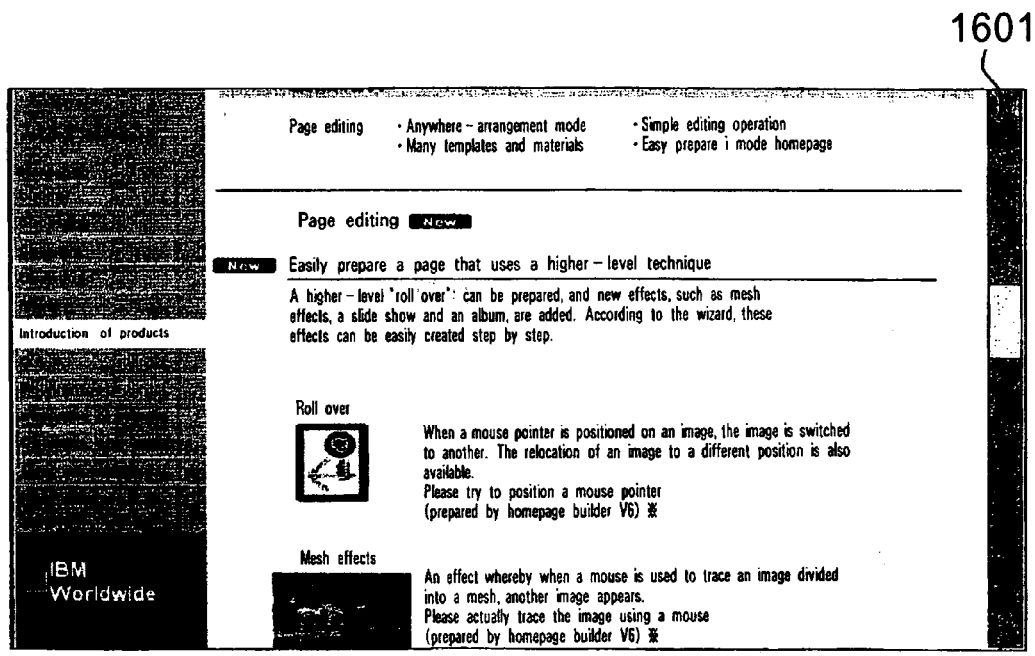
FIG. 16 is a diagram showing the state wherein the digital document in FIG. 15 is displayed using a display method employing using scrolling.

FIG. 9 is a diagram showing an example view provided by the user interface 10 of this embodiment. In FIG. 9, operating buttons 901 to 903 for operating the display of a digital document are provided in a window 900 wherein the digital document is displayed by the user interface 10. Further, the view of a digital document generated by the view generator 20 is displayed in a display column 910. In this example, a digital document in FIG. 15 is displayed. When the digital document is displayed in this embodiment, as is described above, not only the individual sentences are summarized, but also the sizes of the display areas and images for the sentences are changed. In the following explanation, the rate of change for sizes of the display areas and images by using as a reference the layout of the original digital document is called a compression rate.

Of the operating buttons 901 to 903, the view update button 901 is a button for issuing a view update request to the user interface 10. The state of the view in the display column 910 can be changed by clicking on the view update button 901. The original/summary switching button 902 is a button for changing the display form when where the original digital document is displayed unchanged, and the display form when the view generated by the view generator 20 is displayed. It should be noted that a conventional arbitrary display method, such as the display method using a scroll bar, can be used for the display form when the original is displayed. The reduction/enlargement button 903 is a button for reducing or enlarging the size of the display window 900. As will be described later, since the size of the display column 910 is changed as the display size of the display window 900 is altered, the view is also updated.

An indicator 904 is an index indicating which portion of the digital document in the display column 910 is displayed at which compression rate. In the example in FIG. 9, the compression rate is represented by the gray density, and the gradation is employed so that an area having a lower compression rate (nearer the original digital document) has a darker gray color.

The buttons 901 to 903 and the indicator 904 are merely examples of the view operation tools, and are not limited to those shown in the example. Further, an operating tool, such as a tool for returning to a view before it is updated, may be additionally provided in order to perform the view operation more effectively, or the indicator 904 may be removed. In addition, instead of the operating buttons 901 to 903, the interface provided by the Operating System (OS) of a computer may be used for the above operations. For example, when a mouse is used to designate a predetermined portion in a digital document displayed in the display column 910 or to change the size of the display window 900, the view is updated, so that a new view can be provided wherein the location is designated or the new display size is reflected.

In the display column 910, an area enclosed by a broken line 911 is an area having a low compression rate. In this area, a large display area is allocated for each sentence or image in accordance with the viewing data, and the original or the summary similar to the original (the compression rate is small) is displayed. An area enclosed by a chain line 912 is an area having a high compression rate. In this area, a small display area is allocated for each sentence and image in accordance with the viewing data. Further, the summary obtained at a high compression rate is normally displayed in this area, and a small display font is also used to display it in a small display area.

It should be noted that the block lines 911 and 912 are shown merely as references for explaining the compression rate for the display area and the image, and are not set as a clear boundary. That is, the compression rate and the summarization rate for the display area wherein the sentences and the image are displayed are determined for each sentence and each image, and actually, the compression rate for the display area and the summarization rate for the sentence are increased outward, beyond the range enclosed by the line 911 in FIG. 9.

Figure 10:
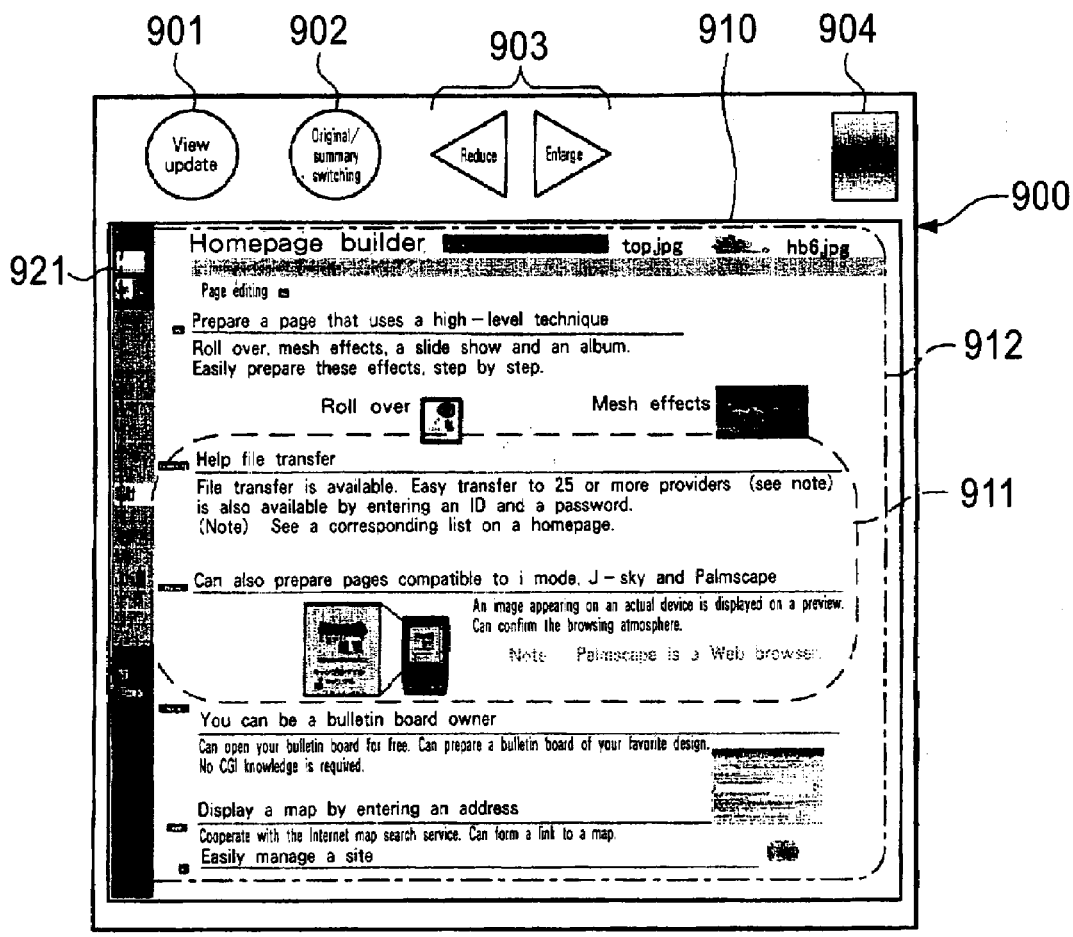
FIG. 10 is a diagram showing the state wherein the view is updated by clicking on the view update button in the state in FIG. 9.

FIG. 10 is a diagram showing the state wherein the view update button 901 has been clicked on in the state shown in FIG. 9 and the view is updated. Generally, since the document is read from first to last, initially, the compression rate for the sentences and the images in the head portion is reduced, and then is increased for the succeeding portions. Each time the view is updated, the range for the low compression rate is shifted toward the end of the document, and the compression rate in the formerly low compression rate portion is increased. When the state in FIG. 9 is compared with the state in FIG. 10, in FIG. 9 a low compression rate and a large display font are employed for the title "Easily prepare a page that uses a higher-level technique" and for the succeeding main body. Further, the explanations for entries "roll over" and "mesh effects" are also given. On the contrary, in FIG. 10, the compression rates for the above two entries are increased, and the compression rate is reduced for the titles "Help file transfer" and "Can prepare pages compatible to i mode, j-sky and Palmscape", the succeeding main body and corresponding images, while the sizes of the display area and the image are increased. For the title "Easily prepare a page that uses a higher-level technique" and the succeeding main body, the summarization rate is higher in FIG. 10 than in FIG. 9. Whereas the main body succeeding the titles "Help file transfer" and "Can prepare pages compatible to the i mode, j-sky and Palmscape", the summarization rate is lower in FIG. 10 than in FIG. 9, and the lengths of sentences is extended.

Further, in FIG. 10, the compression rate is increased for a menu column 921 located in the left upper corner of the display column 910, after the menu column 921 was browsed in the state in FIG. 9. Thus, since the area for the display of the main body is extended, more useful information can be provided for the user.

Figure 11:
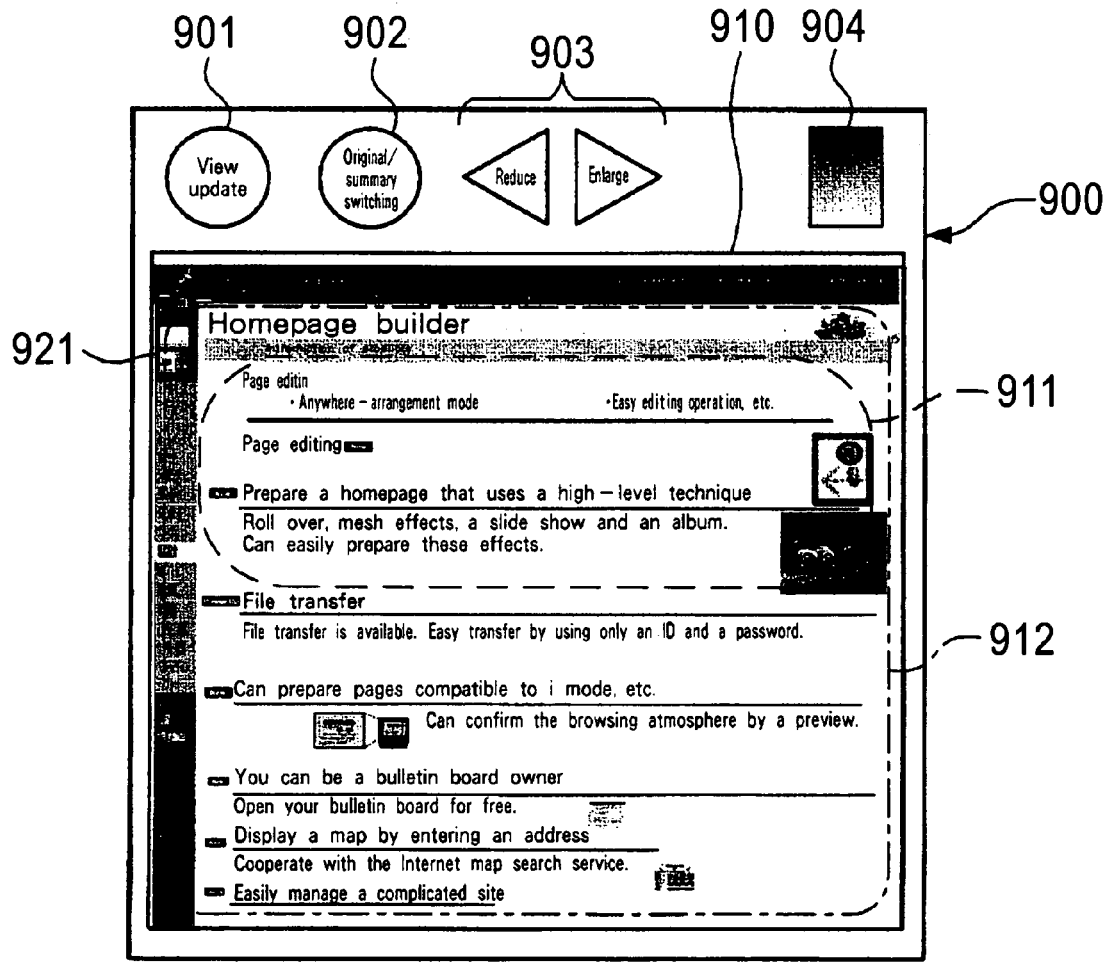
FIG. 11 is a diagram showing the state wherein a digital document is displayed in a display window smaller than that in FIG. 9.

FIG. 11 is a diagram showing the state in the display window 900 wherein the digital document in FIG. 15 is displayed after the window 900 was reduced and is smaller than it was in FIG. 9. The digital document in FIG. 11 is not obtained by reducing the window 900 in the state in FIG. 9, but is displayed from the beginning in the display window 900 having the size shown in FIG. 11. When the states in FIGS. 9 and 11 are compared, in FIG. 11, the display areas for the individual sentences and the sizes of the images are reduced consonant with the size of the display window 900. Further, the summarization rate at which the main body in the display window 900 is summarized is also higher than that at which the main body was summarized in FIG. 9.

Figure 12:
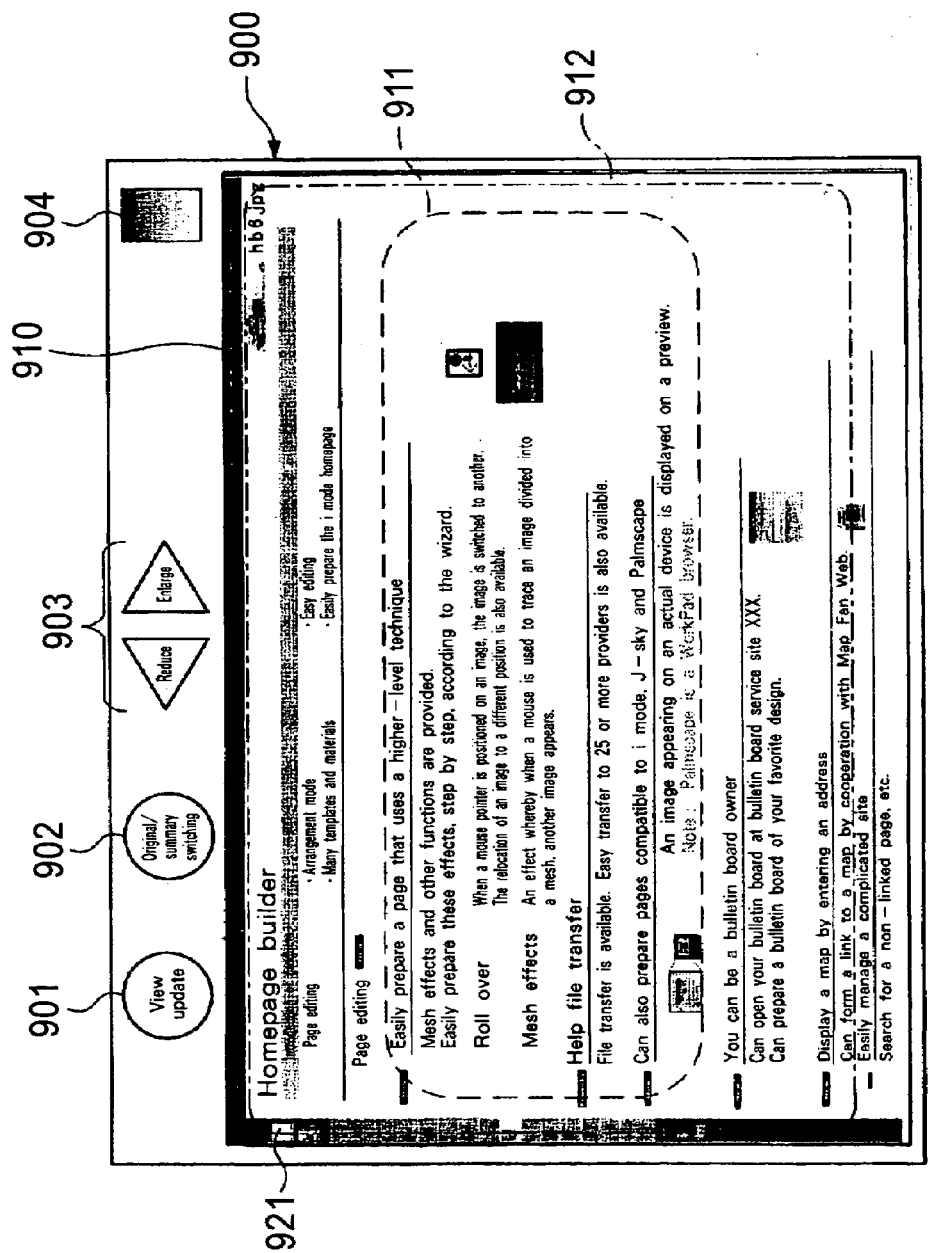
FIG. 12 is a diagram showing the state wherein the display window in the state in FIG. 9 is enlarged using a reduction/enlargement button.

FIG. 12 is a diagram showing the state wherein the reduction/enlargement button 903 has been used to expand the display window 900 and is larger than it was in the state shown in FIG. 9. Unlike FIG. 11, the view in the state shown in FIG. 12 has been obtained by updating and enlarging the view in the state shown in FIG. 9. As a result, when the states in FIGS. 9 and 12 are compared, it is apparent that the low compression rate range has been shifted toward the end, and the sizes of the display areas and the images increased for the titles "Help file transfer" and "Can prepare pages compatible to the i mode, j-sky and Palmscape" and the succeeding main body. On the other hand, the title "Homepage Builder" and the size of the corresponding image are smaller. Further, the summarization rate is reduced for the main body that follows the titles "Help file transfer" and "Can prepare pages compatible to i mode, j-sky and Palmscape", and the volume of the sentences (the number of characters) is increased. Furthermore, the summarization rate is not substantially changed for the main body that follows the title "Easily prepare a page that uses a higher-level technique", and sentences having almost the same volume are displayed. However, the contents are changed from "Can prepare 'roll over', and add new effects, such as mesh effects, a slide show and an album. Can easily prepare them using the wizard" to "Mesh effects and other functions are provided. Easily prepare these effects step by step according to the wizard". This occurs because the meaningful importance level of the summarization keyword changed as the view was updated. That is, the importance level of the summarization keyword used for the display in FIG. 9 has been reduced, and instead, new contents that are not displayed in FIG. 9 are displayed in FIG. 12.

In addition, in FIG. 12, the size of the display column 910 also increased as the display window 900 was enlarged. Since the compression rate for the menu column 921 that it is assumed the user has already browsed is increased, the area for the display of the main body is extended even more.

Figure 13:
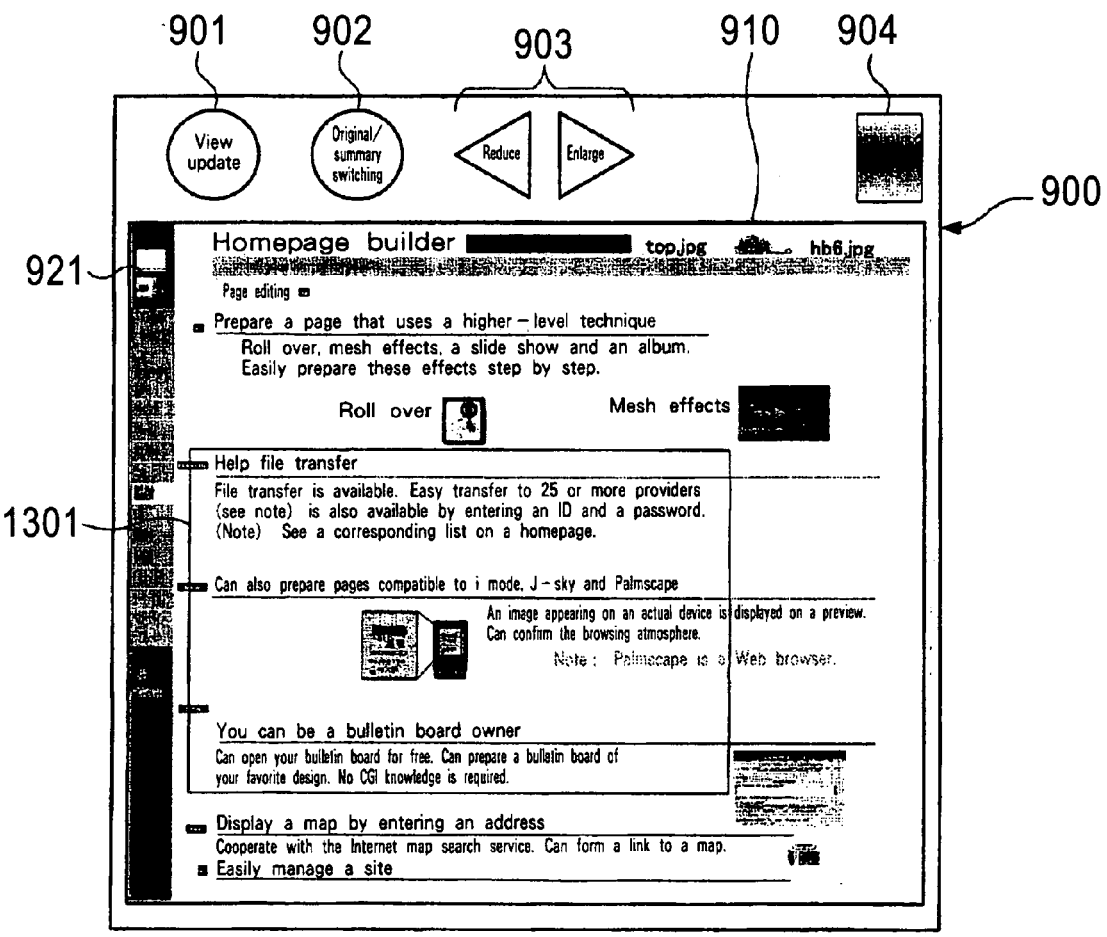
FIG. 13 is a diagram for explaining the operation for designating a specific portion in the view state in FIG. 10 and for reducing the compression rate for that portion, and showing the state wherein the portion for which the compression rate is changed is designated.
Figure 14:
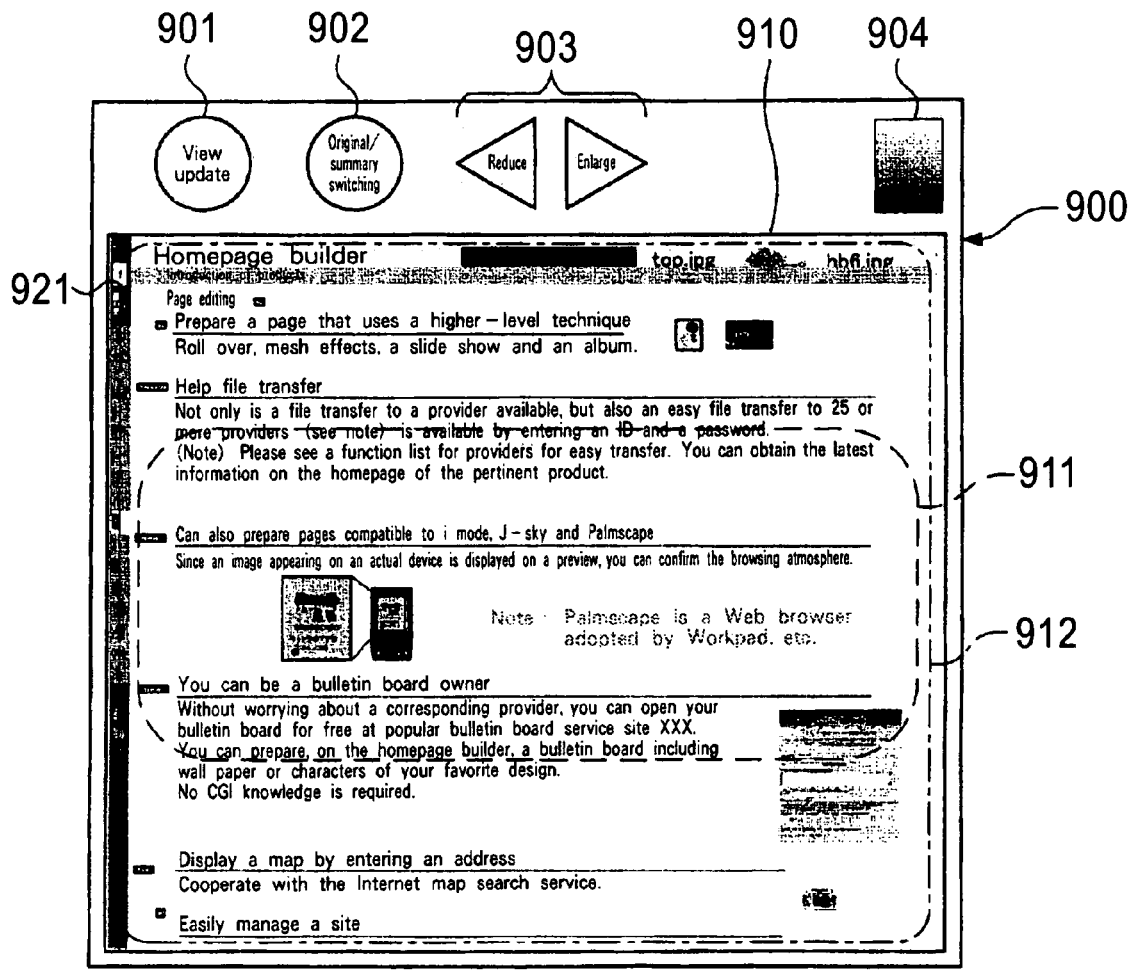
FIG. 14 is a diagram for explaining the operation for designating a specific portion in the view state in FIG. 10 and for reducing the compression rate for that portion, and showing the state wherein the compression rate has been changed.

FIGS. 13 and 14 are diagrams for explaining the operation for designating a specific portion in the view state in FIG. 10, obtained by updating the state in FIG. 9 one time, and for reducing the compression rate of the designated portion. In FIG. 13, a desired portion (a portion containing contents that the user wants to read more closely) is designated as indicated by an enclosing line 1301, and the update button 901 is selected. In addition to being enclosed by the enclosing line 1301, the specific portion can be designated by clicking on a desired element, such as the title, the main body or the image.

In FIG. 14, which shows the state after the view has been changed, the compression rate is reduced for the range designated by the enclosing line 1301 in FIG. 13. Therefore, compared with the state in FIG. 13, the sizes of the display areas and the images are increased for the titles "Help file transfer", "Can prepare pages compatible to i mode, J-sky and Palmscape" and "You can be a bulletin board owner", and the succeeding main body. Further, since the view has been updated, the compression rate for the menu column 921 has been increased, and the area for the display of the main body further extended.

As is described above, according to the present invention, and understanding of the contents or an overview of a desired portion of a digital document can be obtained, while an entire page of the digital document is displayed without explanatory information being added to the digital document and without the document structure, such as the order of articles, being changed.

According to the present invention, the size of a display area and the displayed contents for each portion of a digital document can be controlled based on the structure of the digital document and the operating history of a user, and useful information can be efficiently provided for the user.

The invention claimed is:

1. A digital document browsing system comprising:
    a layout engine, for determining the layout of a digital document having sentences and images, based on digital document display form historical data relating to previous use of said document, by said browsing system;
    a view generator, for generating, in accordance with said layout determined by said layout engine, data relating to the display form of said digital document, said data including a summary preparation request designating sentences in the digital document for which summarization is required, a summarization keyword, and a summarization rate indicative of a ratio of length of a summary to length of original sentences in the digital document, said summarization rate varying and being determined for each sentence within said document, and a compression rate for said images, said compression rate varying for each of said images within said document;
    a summarization engine for generating a summary in response to said data; and
    a display for displaying said digital document based on said data relating to said display form generated by said view generator;
    wherein said display form includes an indicator indicating which portion of the digital document is displayed at which compression rate.

2. The digital document browsing system according to claim 1, wherein said layout engine employs said historical data when allocating a display area, for said display form of said digital document, for each element constituting said digital document.

3. The digital document browsing system according to claim 1, further comprising:
    a history database within said browsing system,
    wherein after said digital document has been displayed, through said display, by using a predetermined display form for a predetermined period of time, and when said display form is updated by said user, data relating to said display form that has been used is stored as historical data in said history database, and
    wherein said layout engine determines said layout of said digital document based on said historical data obtained from said history database.

4. The digital document browsing system according to claim 1, wherein:
    said summarization engine also prepares summaries for the sentences in said digital document based on said historical data acquired for said digital document, and
    wherein said view generator arranges said summaries, prepared by said summarization engine, in accordance with said layout determined by said layout engine, and generates data for a display form.

5. The digital document browsing system according to claim 4, wherein, based on said historical data, said summarization engine determines which parameters are required for summarization, and prepares a summary for each of the predetermined sentence elements that constitute the sentences of said digital document.

6. The digital document browsing system according to claim 1, further comprising:
    a display form generator, for generating a display form wherein display areas to be allocated to elements constituting said digital document are altered in accordance with importance levels of said elements, while the general structure of the digital document is maintained and all of the elements of the digital document are always displayed simultaneously on a single screen.

7. The digital document browsing system according to claim 6, wherein, in order to display an entire page of said digital document in a single display area, said display form generator allocates a small display area for an element having a low importance level, and a large display area for an element having a high importance level.

8. The digital document browsing system according to claim 6, wherein said display form generator arranges a display area near the center of said display form for an element having a high importance level, and arranges a display area nearer the side of said display form for an element having a low importance level.

9. A digital document browsing system comprising:
    a summarization engine, for preparing summaries for sentences in a digital document based on historical data related to a display form previously used for said digital document and data relating to the display form of said digital document, said data including a summary preparation request designating sentences in the digital document for which summarization is required, a summarization keyword, and a summarization rate indicative of a ratio of length of a summary to length of original sentences in the digital document, said summarization rate varying and being determined for each sentence within said document, and a compression rate for any images within said document, said compression rate varying for each image;

a view generator, for inserting, in the display form, said summaries prepared by said summarization engine instead of the original contents of said digital document, and for generating data relating to the display form of said digital document; and a display for displaying said digital document on a display device based on said data, generated by said view generator, relating to said display form;

wherein said display form includes an indicator indicating which portion of the digital document is displayed at which compression rate.

10. The digital document browsing system according to claim 9, wherein, based on said historical data, said summarization engine determines which parameters are required for summarization, and prepares said summary for each of the predetermined sentence elements constituting the sentences of said digital document.

11. The digital document browsing system according to claim 9, further comprising:

a history database within said browsing system, wherein after said digital document has been displayed, through said display, with a predetermined display form for a predetermined period of time, and when said user has updated said display form, data relating to said display form that has been used is stored as historical data in said history database, and wherein said layout summarization engine summarizes said sentences of said digital document based on said historical data obtained from said history database.

12. A browser for displaying a digital document on a display device comprising:

an input function for entering a digital document to be displayed; and a display function, for displaying said digital document using a predetermined display form, wherein said display function displays, instead of the original contents of said digital document, a summary that is prepared based on historical data related to a display form for said document previously used for display of said digital document on said display device and other data relating to the display form of said digital document, said other data including a summary preparation request designating sentences in the digital document for which summarization is required, a summarization keyword, and a summarization rate indicative of a ratio of length of a summary to length of original sentences in the digital document, said summarization rate varying and being determined for each sentence within said document, and a compression rate for any images within said document, said compression rate varying for each image;

a display, for displaying said digital document on said display device based on said data, generated by said display function, relating to said display form;

wherein said display form includes an indicator indicating which portion of the digital document is displayed at which compression rate.

13. The browser according to claim 12, wherein, based on said historical data, said display function determines which parameters are required for summarization, and prepares said summary for each of the predetermined sentence elements constituting the sentences of said digital document.

14. The browser according to claim 12, wherein, based on said historical data, said display function displays said digital document using a display form wherein said summary is displayed in display areas arranged for the individual elements that constitute said digital document.

15. The browser according to claim 12, further comprising:

a display updating function, for updating said display form, wherein according to a predetermined rule said display function, while maintaining the structure of said digital document, alters display areas to be allocated for elements constituting said digital document so as to always simultaneously display all of its elements on a single screen, and displays said digital document in the resultant display areas.

16. The browser according to claim 15, wherein said display function displays an image, which is an element constituting said digital document, using a size that corresponds to the display area of a sentence portion in said digital document that is relevant to said image.

17. The browser according to claim 15, wherein, in the display form of said digital document to be displayed, initially, said display function enlarges a display area for an element located at the head of said digital document, and reduces display areas for succeeding elements; and reduces said summarization rate for an element located at the head of said digital document and increases said summarization rate for succeeding elements, and wherein, each time said display updating function updates said display form upon receiving an update request, said display function shifts rearward the range wherein a large display area is set and said summarization rate is reduced for the sentence element.

18. The browser according to claim 15, wherein said display updating function accepts an update request for a predetermined designated portion in said digital document that is currently displayed, and in accordance with said update request, enlarges a display area for an element in said designated portion, and displays a sentence in said designated portion, instead of a sentence having a low summarization rate.

19. A sentence summarization system comprising:

a summarization history database, in which historical data for the summarization of sentences in a document is stored; and a summarization engine, for summarizing sentences based on said historical data stored in said summarization history database for said document, and other data relating to the display form of said digital document, said other data including a summary preparation request designating sentences in the digital document for which summarization is required, a summarization keyword, and a summarization rate indicative of a ratio of length of a summary to length of original sentences in the digital document, said summarization rate varying and being determined for each sentence within said document, and a compression rate for any images within said document, said compression rate varying for each image;

wherein said display form includes an indicator indicating which portion of the digital document is displayed at which compression rate.

20. The sentence summarization system according to claim 19, wherein, based on said historical data, said summarization engine determines which parameters are required for summarization, and prepares said summary for each of the predetermined sentence elements that constitute the sentences of said digital document.

21. A sentence summarization method comprising the steps of:
   obtaining target sentences to be summarized;
   obtaining historical data related to a summary for said target sentences from a summarization history database in which historical data are stored that are related to a previous summarization of a document containing said sentences, said data relating to the display form of said digital document, said data including a summary preparation request designating sentences for which summarization is required, a summarization keyword, and a summarization rate indicative of a ratio of length of a summary to length of the target sentences in the digital document, said summarization rate varying and being determined for each of said target sentences within said document, and a compression rate for any images within said document, said compression rate varying for each image; and
   determining which parameters are required for the preparation of said summary based on said historical data, and preparing said summary of said target sentences based on said parameters;
   wherein said display form includes an indicator indicating which portion of the digital document is displayed at which compression rate.

22. The sentence summarization method according to claim 21, wherein said step of preparing said summary includes a step of:
   determining which parameters are required for summarization, and preparing said summary for each of the predetermined sentence elements that constitute the sentences of said digital document.

23. A storage medium on which an output of a computer stores a computer-readable program that permits said computer to perform:
   a process for extracting the structure of a digital document to be displayed;
   a process for replacing, for each of the elements of said structure, said elements including sentences and images, the original contents of said digital document with a summary that is prepared based on historical data related to a display form for said document that was previously used for said digital document and other data relating to the display form of said digital document, said other data including a summary preparation request designating sentences for which summarization is required, a summarization keyword, and a summarization rate indicative of a ratio of length of a summary to length of target sentences in the digital document, said summarization rate varying and being determined for each of said target sentences within said document, and a compression rate for said images, said compression rate varying for each of said images within said document;
   generating data related to a new display form;
   a process for displaying said digital document on a display device based on said data related to said new display form; and
   a process for providing on said display form an indicator indicating which portion of the digital document is displayed at which compression rate.

24. The storage medium according to claim 23, further comprising:
   a process for generating data, while maintaining said structure of said digital document, related to said display form wherein display areas to be allocated to elements that constitute said digital document are altered in accordance with the importance levels of said elements, so that all elements of said digital document are always presented simultaneously on one screen.

25. A storage medium on which an output of a computer stores a computer-readable program that permits said computer to perform:
   a process for obtaining target sentences to be summarized;
   a process for obtaining historical data related to a summary for said target sentences from a summarization history database in which historical data are stored that are related to a previous summarization of a document containing said sentences and other data relating to the display form of said digital document, said other data including a summary preparation request designating the sentence for which summarization is required, a summarization keyword, and a summarization rate indicative of a ratio of length of a summary to length of the target sentences in the digital document, said summarization rate varying and being determined for each of said target sentences within said document, and a compression rate for any images within said document, said compression rate varying for each image;
   a process for determining which parameters are required for the preparation of said summary based on said historical data, and preparing said summary of said target sentence based on said parameters; and
   a process for providing on said display form an indicator indicating which portion of the digital document is displayed at which compression rate.

26. The digital document browsing system according to claim 1, wherein said user interface is configured to receive a view update request based on an operation performed by a user, said user interface causing said view generator to generate a new view in response to said view update request.

27. The digital document browsing system according to claim 9, wherein said user interface is configured to receive a view update request based on an operation performed by a user, said user interface causing said view generator to generate a new view in response to said view update request.

28. The browser according to claim 12, further comprising a user interface configured to receive a view update request based on an operation performed by a user, said user interface causing said display function to generate a new view in response to said view update request.

29. The digital document browsing system according to claim 6, wherein importance levels increase as time increases since information was last displayed.

* * * * *